(12) United States Patent
Labonte et al.

(10) Patent No.: US 9,548,892 B2
(45) Date of Patent: Jan. 17, 2017

(54) METHOD AND SYSTEM FOR PREVENTING POLARIZATION IN A NETWORK

(71) Applicant: Arista Networks, Inc., Santa Clara, CA (US)

(72) Inventors: François Labonte, Santa Clara, CA (US); Hugh W. Holbrook, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 172 days.

(21) Appl. No.: 14/605,685

(22) Filed: Jan. 26, 2015

(65) Prior Publication Data

US 2016/0218916 A1 Jul. 28, 2016

(51) Int. Cl.
*H04L 12/24* (2006.01)
*H04L 12/721* (2013.01)
*H04L 12/709* (2013.01)
*H04L 12/743* (2013.01)

(52) U.S. Cl.
CPC ........... *H04L 41/0803* (2013.01); *H04L 45/12* (2013.01); *H04L 45/245* (2013.01); *H04L 45/66* (2013.01); *H04L 45/7453* (2013.01)

(58) Field of Classification Search
CPC ...... H04L 41/0803; H04L 45/12; H04L 45/66; H04L 45/245; H04L 45/7453
See application file for complete search history.

(56) References Cited

U.S. PATENT DOCUMENTS

| | | | | |
|---|---|---|---|---|
| 8,929,249 B2* | 1/2015 | Yong | ................... | H04L 47/2483 370/216 |
| 2005/0265358 A1* | 12/2005 | Mishra | ..................... | H04L 45/02 370/400 |
| 2006/0133425 A1* | 6/2006 | Kimball | ................ | G06F 13/387 370/477 |
| 2012/0311221 A1* | 12/2012 | Freking | ............... | G06F 13/4081 710/313 |
| 2013/0250829 A1* | 9/2013 | Kurokawa | .............. | H04L 12/12 370/311 |
| 2014/0204732 A1* | 7/2014 | Arumugam | ............. | H04L 45/22 370/225 |
| 2014/0314094 A1* | 10/2014 | Saltsidis | ................. | H04L 47/34 370/394 |
| 2014/0314095 A1* | 10/2014 | Saltsidis | ................. | H04L 47/41 370/394 |

(Continued)

*Primary Examiner* — Ajay Cattungal
(74) *Attorney, Agent, or Firm* — Osha Liang LLP

(57) ABSTRACT

A method for configuring network devices. The method includes selecting a first hash function to use to process packets using Equal-Cost Multi-Path (ECMP) on a network device, where the first hash function is selected from a set of hash functions using a second hash function, a network chip ID of the network chip in the network device, a network device media access control (MAC) address, and an ECMP flag. The method further includes selecting a third hash function to use to process packets using a Link Aggregation Group (LAG), where the third hash function is selected from the set of hash functions using a fourth hash function, the network chip ID of the network chip in the network device, the network device MAC address, and the LAG flag. The method further includes processing a packet received by the network device using the first hash function or the third hash function.

20 Claims, 4 Drawing Sheets

(56) References Cited

U.S. PATENT DOCUMENTS

| | | | | |
|---|---|---|---|---|
| 2015/0146735 A1* | 5/2015 | Liang | .................. | H04L 49/00 |
| | | | | 370/400 |
| 2016/0094400 A1* | 3/2016 | Liang | .................. | H04L 41/12 |
| | | | | 370/254 |
| 2016/0134511 A1* | 5/2016 | Wang | ................ | H04L 45/122 |
| | | | | 370/392 |
| 2016/0204959 A1* | 7/2016 | Liang | .............. | H04L 12/6418 |
| | | | | 370/395.53 |

* cited by examiner

METHOD AND SYSTEM FOR PREVENTING POLARIZATION IN A NETWORK

BACKGROUND

Network devices such as routers or multi-layer switches are network devices that transmit data packets within and between networks.

SUMMARY

In general, in one aspect, the invention relates to a method for configuring network devices. The method includes selecting a first hash function to use to process packets using Equal-Cost Multi-Path (ECMP) on a network device, where the first hash function is selected from a set of hash functions using a second hash function, a network chip identification number (ID) of the network chip in the network device, a network device media access control (MAC) address, and an ECMP flag. The method further includes selecting a third hash function to use to process packets using a Link Aggregation Group (LAG), where the third hash function is selected from the set of hash functions using a fourth hash function, the network chip ID of the network chip in the network device, the network device MAC address, and the LAG flag. The method further includes processing a packet received by the network device using the first hash function or the third hash function.

In general, in one aspect, the invention relates to a network device. The network device includes a network chip, a plurality of ports, and a network device operating system (OS). The network device OS selects a first hash function to use to process packets using Equal-Cost Multi-Path (ECMP) on a network device. The first hash function is selected from a set of hash functions using a second hash function, a network chip identification number (ID) of the network chip in the network device, a network device media access control (MAC) address, and an ECMP flag. The network device OS further selects a third hash function to use to process packets using a Link Aggregation Group (LAG). The third hash function is selected from the set of hash functions using a fourth hash function, the network chip ID of the network chip in the network device, the network device MAC address, and the LAG flag. The network device OS further processes a packet received by the network device via a port, using the first hash function or the third hash function.

In general, in one aspect, the invention relates to a non-transitory computer readable medium comprising instructions, which when executed by a processor, enable a network device to select a first hash function to use to process packets using Equal-Cost Multi-Path (ECMP) on the network device. The first hash function is selected from a set of hash functions using a second hash function, a network chip identification number (ID) of the network chip in the network device, a network device media access control (MAC) address, and an ECMP flag. The instructions, when executed by a processor, further enable the network device to select a third hash function to use to process packets using a Link Aggregation Group (LAG). The third hash function is selected from the set of hash functions using a fourth hash function, the network chip ID of the network chip in the network device, the network device MAC address, and the LAG flag. The instructions, when executed by a processor, further enable the network device to process a packet received by the network device via a port, using the first hash function or the third hash function.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a network device to perform routing. More specifically, one or more embodiments of the invention include configuring Equal-Cost Multi-Path (ECMP) routing functionality and/or Link Aggregation Group (LAG) functionality on the network device. In one or more embodiments of the invention, the configuration of the network device enables the network to receive packets, process the received packets, select an appropriate route for the received packets, and send the received packets to the appropriate next hop in its path towards the packets' destination.

The following description describes some embodiments of the invention in which the network devices are routers. However, the invention is not limited to routers; rather embodiments of the invention may be extended to include other network devices (e.g. multi-layer switches, etc.).

Figure 1:
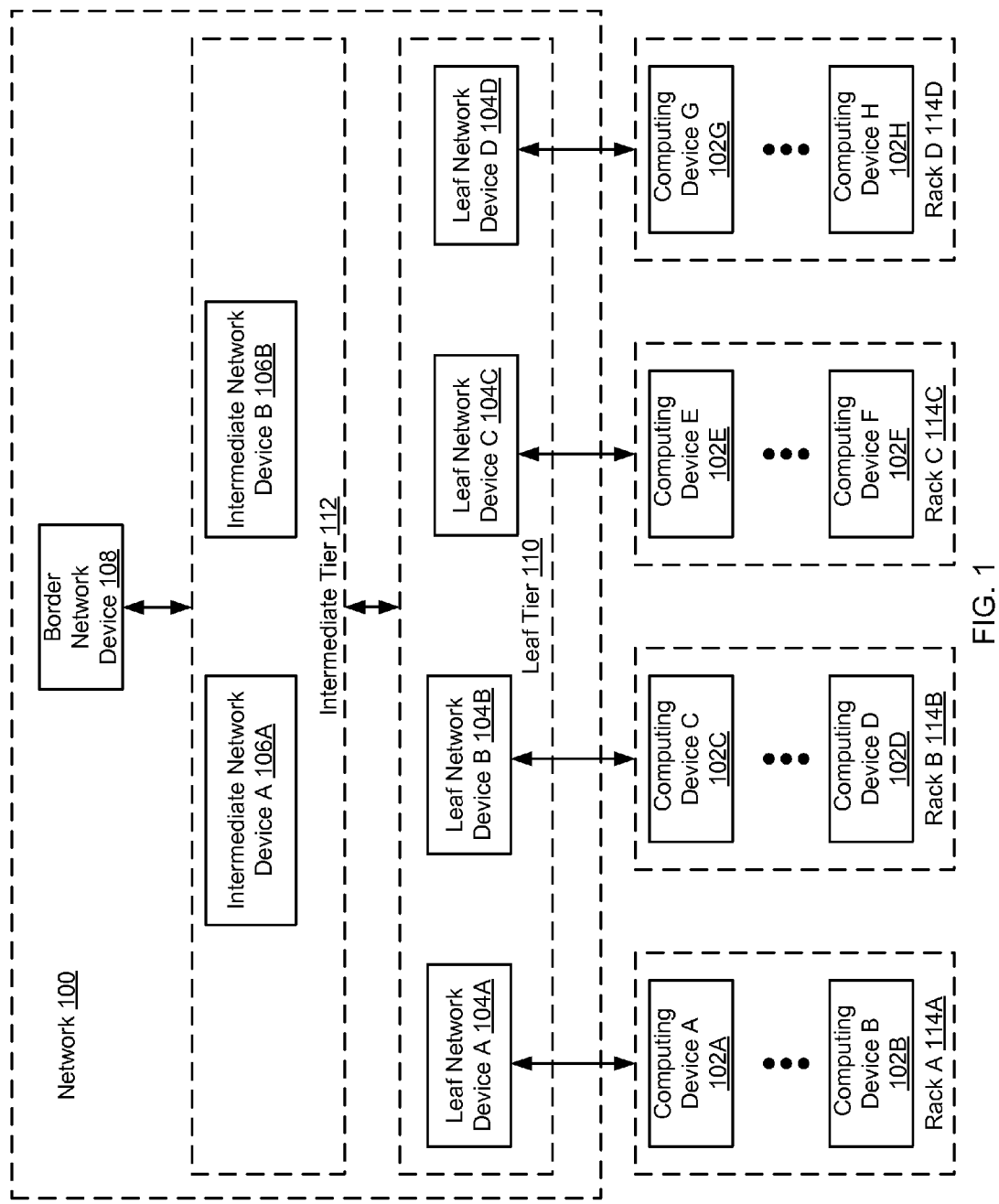
FIG. 1 shows a network that includes networking devices in accordance with one or more embodiments of the invention.

FIG. 1 shows a network that includes networking devices in accordance with one or more embodiments of the invention. In one embodiment of the invention, the network (100) may connect to computing devices (102A-102H) that may be housed in racks (114A-114D). The network (100) may be organized hierarchically. A leaf tier (110) may include leaf network devices (104A-104D), an intermediate tier (112) may include intermediate network devices (106A-106B), and in addition the network may include a border network device (108). Each of these components is described below.

In one of the embodiments of the invention, the network (100) is a set of network devices (104A-D, 106A-106B, 108) that are configured to act in concert to provide a connection for exchange of data packets between the computing devices (102A-102H) or between the computing devices (102A-102H) and other computing devices outside of the network (not shown).

In one of the embodiments of the invention, the computing devices (102A-102H), housed in racks (114A-114D), may be servers. A server may include a processor, memory, and one or more physical network interfaces. Examples of types of servers include, but are not limited to, Dynamic Host Configuration Protocol (DHCP) servers, database servers, application servers, file servers, print servers, and mail servers. The at least one network interface of the server connects the server to the network (100) via a leaf network device (104A-104D).

In one of the embodiments of the invention, the leaf network devices (104A-104D) are organized in the leaf tier (110). The leaf tier (110) forms an access layer with connections to the computing devices (102A-102H), and connections to the intermediate network devices (106A-106B) in the intermediate tier (112). The aforementioned connections enable packets to be communicated between computing devices (102A-102H) located in different racks (114A-114D), for example, between computing device A (102A) in rack A (114A) and computing device F (102F) in rack C (114C), via leaf network device A (104A), intermediate network device A (106A) or intermediate network device B (106B), and leaf network device C (104C). The intermediate network devices (106A-106B) may further be connected to the border network device (108) (e.g., a border router), enabling access to other network devices and other computing devices, located outside of the network (100). For example, computing device D (102D) in rack B (114B) may access a database server located in a remote data center (not shown), i.e. in a network different from the network (100), via leaf network device B (104B), intermediate network device A (106A) or intermediate network device B (106B), and the border network device (108).

Figure 4:
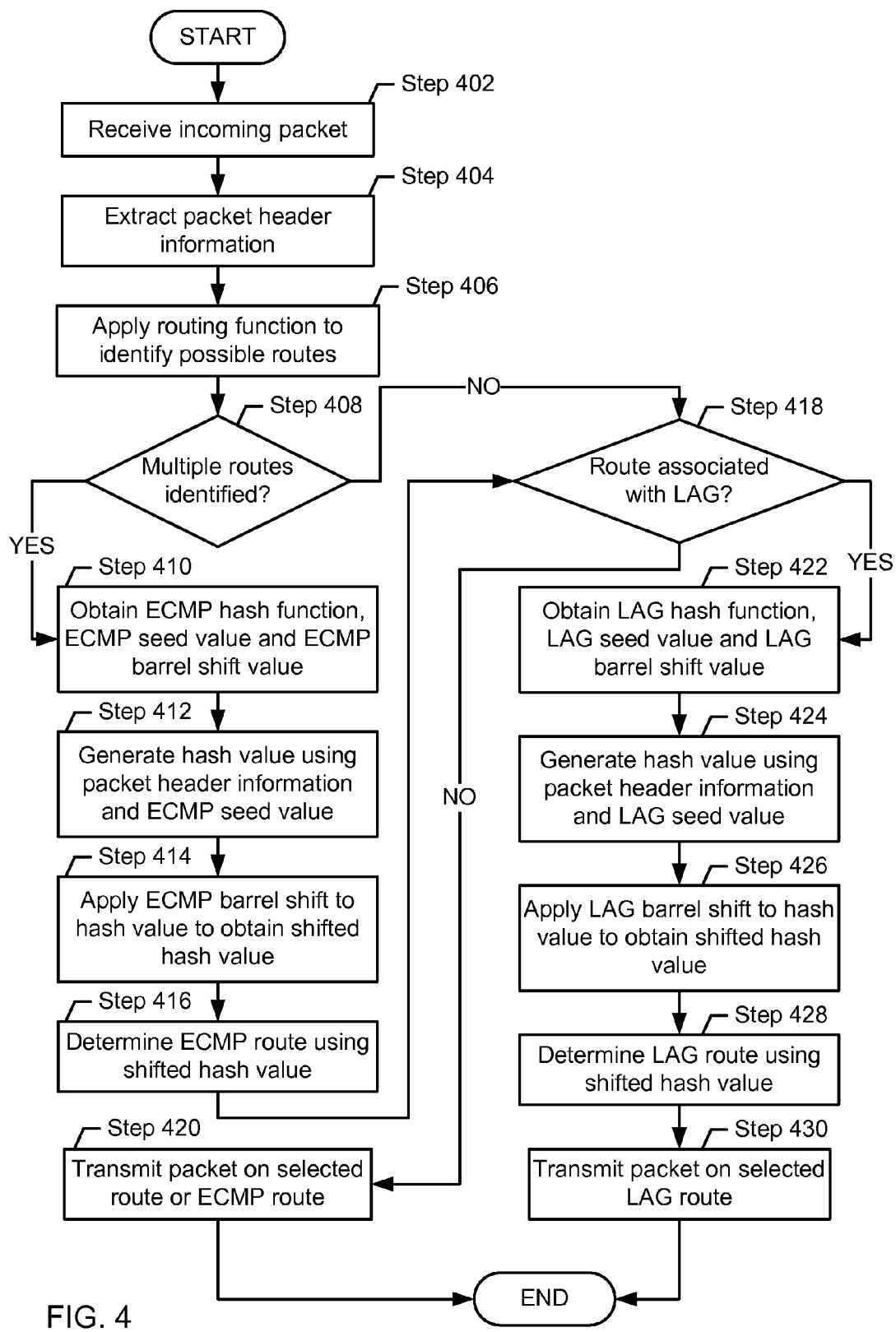
FIG. 4 shows a flowchart in accordance with one or more embodiments of the invention.

In one embodiment of the invention, leaf network devices (104A-104D), intermediate network devices (106A-106B), and the border network device (108) may be, for example, routers or multi-layer switches configured to perform various switching functions (e.g., layer 2 functions) and routing functions, e.g., layer 3 functions and functions implemented in FIG. 4. In one embodiment of the invention, routing functions include performing routing table lookups (see FIG. 4), implementing Link Aggregation Groups (LAGs) an Equal-Cost Multi-Path (ECMP) routing. One or more of aforementioned routing functions may use information in a packet header in the packet, e.g., source Internet Protocol (IP) address, destination IP address, etc. In one embodiment of the invention, the IP address is an address defined by IPv4 or IPv6.

In one embodiment of the invention, the leaf network devices (104A-104D), intermediate network devices (106A-106B), and the border network device (108) include routing tables. A routing table may include information about the topology of the network surrounding the network device, the routes to network destinations, next-hop information, and metrics related to the routes. Next hop information may include the IP address of the next network device to which the packet is to be transmitted (i.e., sent) on the route toward the destination of the packet. Metrics include, but are not limited to, information related to the route the packet may take towards its destination and may be represented by numerical values representative of the "cost" of the route. For example, the cost of the route may be measured by the number of "hops" (i.e., network devices) through which the packet must travel before reaching its destination.

Figure 2:
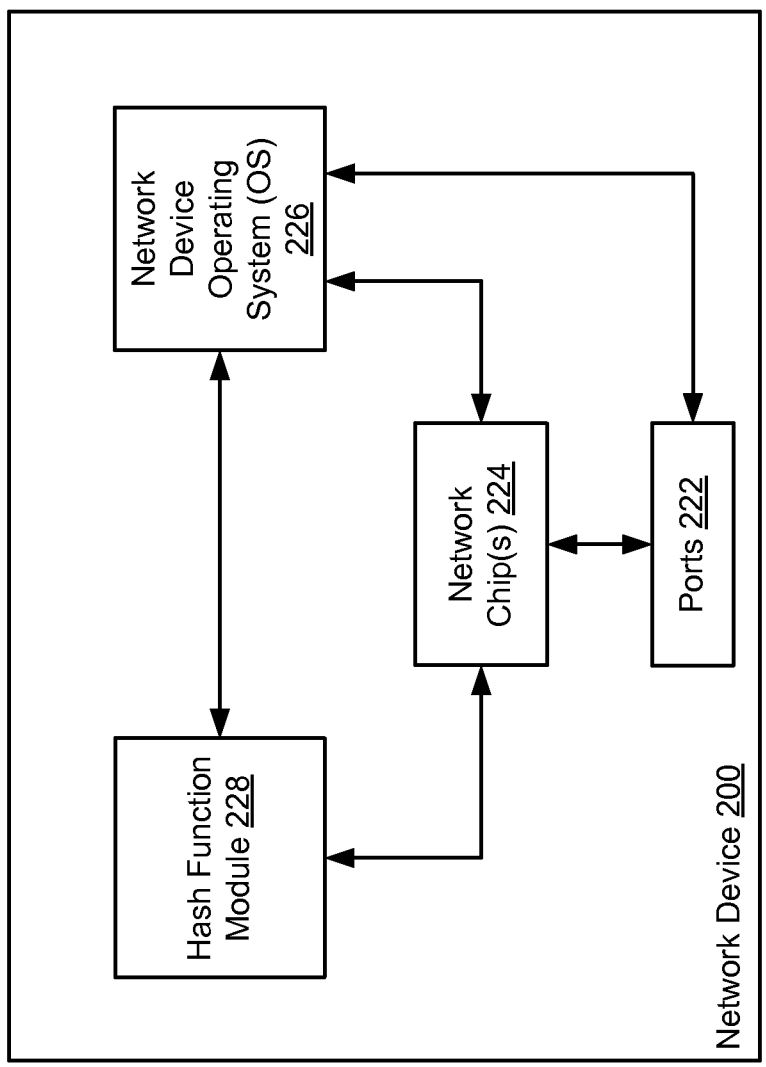
FIG. 2 shows a network device in accordance with one or more embodiments of the invention.

FIG. 2 shows a network device (200) in accordance with one or more embodiments of the invention. In one embodiment of the invention, the network device (200) may include ports (222), a network chip(s) (224), a network device operating system (226), and a hash function module (228). Each of these components is described below.

In one embodiment of the invention, the ports (222) of the network device (200) provide the physical interfaces to other network devices or computing devices (not shown). Incoming packets may be received by the network device (200) via the ports (222), and outgoing packets may be sent by the network device (200) via the ports (222). The network device is configured to receive packets via a port on the network device, and to process the packets in accordance with one or more embodiments of the invention, and send the packet via a port on the network device. The network chip (224) interfaces with the ports (222) and processes the packets. In one or more embodiments of the invention, in a modular network device (200), groups of ports (222) may be served by one or more network chips located on one or more line cards (not shown).

In one embodiment of the invention, the network device (200) includes a network device operating system (OS) (226). The network device OS (226) is software that manages the hardware of the network device to provide functionality to the network device (e.g., functionality to implement methods shown in FIGS. 3 and 4). In one embodiment of the invention, the network device OS (226) and the network chip (224) have access to the hash function module (228). The hash functions of the hash function module (228) may be used to implement part of the routing functions in the network device (200), as described in detail below. In one embodiment of the invention, the hash function module (228) implements a set of hardware-implemented hash functions, e.g., hash functions implemented using specialized hardware.

One skilled in the art will recognize that the architecture of a network device is not limited to the components shown in FIG. 2. For example, the network device may include other processors or memory not shown in FIG. 2. Further, the number of ports and the number of network chips may vary depending on the requirements of the network in which the network device is located without departing from the invention.

Figure 3:
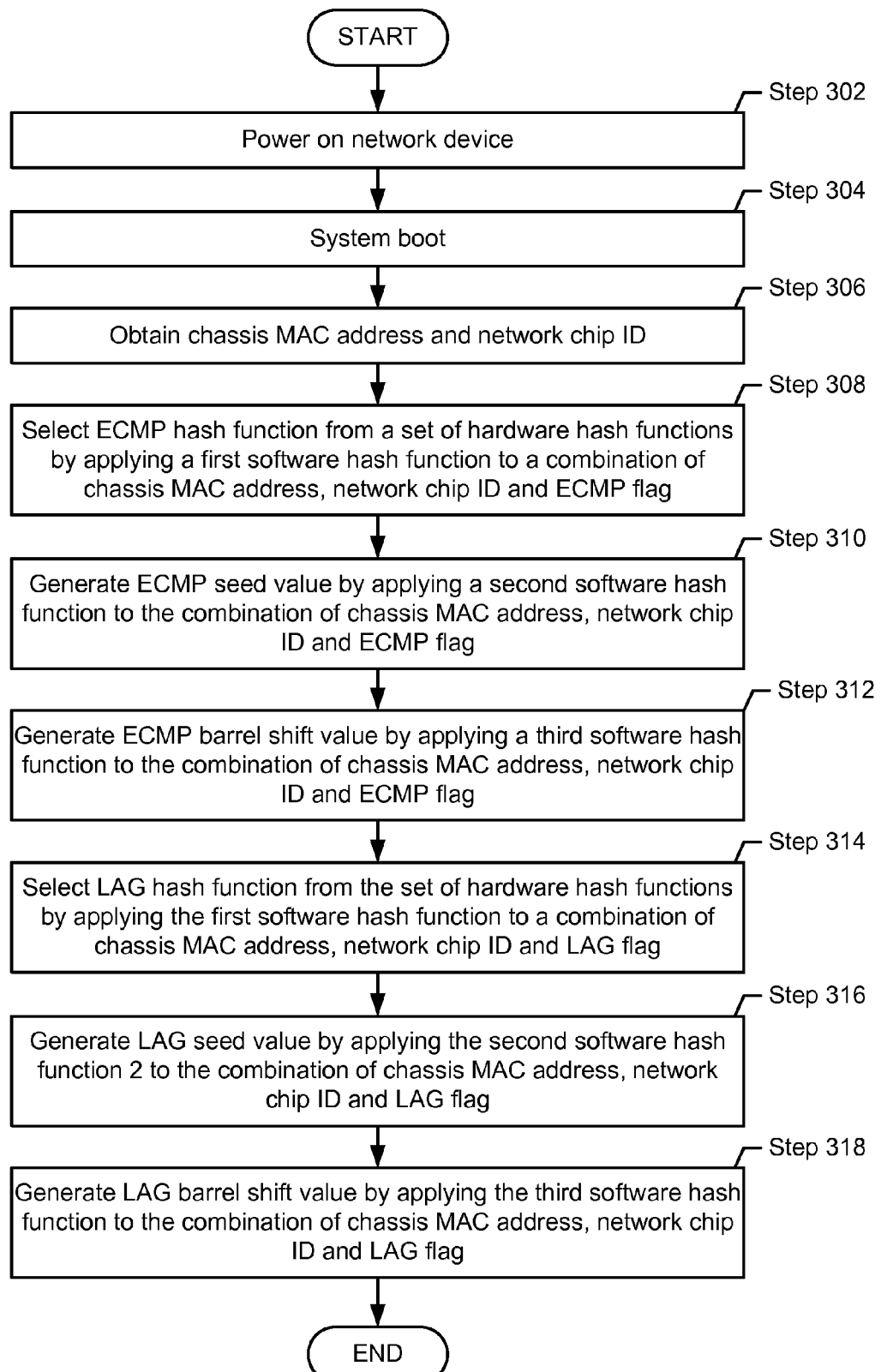
FIG. 3 shows a flowchart in accordance with one or more embodiments of the invention.

FIGS. 3-4 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-4 may be performed in parallel with any other steps shown in FIGS. 3-4 without departing from the invention.

FIG. 3 shows a method for initializing the network device when the network device is powered on. During the initialization, sets of parameters of the hash function module are determined. In one or more embodiments of the invention, the initialization of the sets of parameters of the hash function module does not require manual configuration by a user or system administrator. Rather, the parameters are automatically set to values that depend on network-device-specific information. The parameters are therefore set in a deterministic manner, i.e. restarting the network device, for example, results in the same network-device-specific parameter sets. In one or more embodiments of the invention, the network-device-specific information includes a media access control (MAC) address of the network device that is unique and specific to the network device and a network chip ID that is unique and specific to the network chip. Therefore, there is a high probability that executing this method for initializing the network device produces non-identical sets of parameters on different network devices that have the same types of network chips. The routing decisions made by different network devices of the same type are therefore different. In one or more embodiments of the invention, this automated initialization of the sets of parameters of the hash function module may be combined with manual selection of one or more of the parameters. The sets of parameters of the hash function module are set during the boot process of the network device before the network device begins to execute the routing method (see e.g., FIG. 4).

Turning to FIG. 3, in Step 302, the network device is powered on. In Step 304, the network device performs a boot sequence. In one or more embodiments of the invention, the boot sequence may include performing a set of diagnostic hardware tests, loading the network device operating system (OS), and passing control of the network device to the network device OS.

In Step 306, the network device OS retrieves the hardware-stored MAC address of the network device and the network chip identification number (ID). The MAC address is hardware-encoded and serves as a unique identifier specific to the network device. The network chip ID is hardware-encoded and serves as a unique identifier specific to the network chip.

In Step 308, the ECMP hash function to be used for ECMP routing is selected. Due to the cost of hardware-implemented hash functions, the number N of hardware-implemented hash functions may be limited. In one of the embodiments there may be, for example, a total of N=6 hardware-implemented hash functions. Three of the hardware-implemented hash functions may be reserved for ECMP routing, and three of the hardware-implemented hash functions may be reserved for LAG selection. For example, hardware-implemented hash functions 0, 1, and 2 may be reserved for ECMP routing. The ECMP hash function is selected from the set of three hardware-implemented hash functions that are reserved for ECMP routing, i.e. hardware-implemented hash functions 0, 1, and 2. The ECMP hash function is selected based on inputs that include the MAC address of the network device, the network chip ID, and an additional flag set to indicate ECMP routing. The additional flag may be, for example, a single bit that is set to "1" to indicate ECMP routing. A software hash function A, implemented by the network device OS, may be applied to these inputs. The output of this software hashing is a hash value which may be mapped to hardware-implemented hash functions 0, 1, and 2. For example, the hash value may be mapped to one of the hardware-implemented hash functions using the modulo operation. Accordingly, the hardware-implemented hash function may be selected as follows: "(hash value) mod N/2."

In Step 310, an ECMP seed value to be used for ECMP routing is generated. In one or more embodiments of the invention, the ECMP seed value may be a 16-bit value. The ECMP seed value may be generated by applying a software-implemented hash function B to the inputs that include the MAC address of the network device, the network chip ID, and the additional flag set to indicate ECMP routing.

In Step 312, an ECMP barrel shift value to be used for ECMP routing is generated. A barrel shift is a circular shift. For example, a 16-bit value '0010111000000111', barrel-shifted 3 digits to the left, becomes '0111000001111001'. In one or more embodiments of the invention, the ECMP barrel shift value may be a 4-bit value, indicating a shift ranging from 0 to 15 digits. The ECMP barrel shift value may be generated by applying a software-implemented hash function C to the inputs that include the MAC address of the network device, the network chip ID, and the additional flag set to indicate ECMP routing.

In Step 314, the LAG hash function to be used for LAG selection is selected. As noted above, in one or more embodiments of the invention, the network device includes a set of hardware-implemented hash functions. Due to the cost of hardware-implemented hash functions, the number N of hardware-implemented hash functions may be limited. In one of the embodiments there may be, for example, a total of N=6 hardware-implemented hash functions. Three of the hardware-implemented hash functions may be reserved for ECMP routing, and three of the hardware-implemented hash functions may be reserved for LAG resolution. For example, hardware-implemented hash functions 3, 4, and 5 may be reserved for LAG resolution. The LAG hash function is selected from the set of three hardware-implemented hash functions that are reserved for LAG routing, i.e. hardware-implemented hash functions 3, 4, and 5. The LAG hash function is selected based on inputs that include the MAC address of the network device, the network chip ID, and an additional flag set to indicate LAG selection. The additional flag may be, for example, a single bit that is set to "0" to indicate LAG selection. The software hash function A, implemented by the network device OS, may be applied to these inputs. The output of this software hashing is a hash value which may be mapped to hardware-implemented hash functions 3, 4, and 5. For example, the hash value may be mapped to one of the hardware-implemented hash functions using the modulo operation. Accordingly, the hardware-implemented hash function may be selected as follows: "N/2+((hash value) mod N/2)."

In Step 316, a LAG seed value to be used for LAG selection is generated. In one or more embodiments of the invention, the LAG seed value may be a 16-bit value. The LAG seed value may be generated by applying the software-implemented hash function B to the inputs that include the MAC address of the network device, the network chip ID, and the additional flag set to indicate LAG routing.

In Step 318, a LAG barrel shift value to be used for LAG routing is generated. In one or more embodiments of the invention, the LAG barrel shift value may be a 4-bit value, indicating a shift ranging from 0 to 15 digits. The LAG barrel shift value may be generated by applying the software-implemented hash function C to the inputs that include the MAC address of the network device, the network chip ID, and the additional flag set to indicate LAG routing.

In one or more embodiments of the invention, where the network device includes multiple network chips located on one or more line cards, the flowchart of FIG. 3 is implemented for each network chip.

FIG. 4 shows a method for processing a packet received by the network device, processing the packet by performing routing on the packet, and transmitting the processed packet. The network-device-specific parameter sets initialized during the boot process, as described in detail above, govern the routing decisions of the network device.

Turning to FIG. 4, in Step 402, a packet is received on a port of a network device. The packet is one of a sequence of packets associated with a flow in the network. The flow defines the source of the incoming packet and the destination of the incoming packet.

In Step 404, the packet header is obtained from the packet to identify the flow. In one or more embodiments of the invention, the source IP address and the destination IP address are obtained from the packet header.

In Step 406, the network device determines available routes for routing the packet to the destination defined by the flow. In one embodiment of the invention, the network devices performs a routing table lookup. As described above, the routing table includes information about the topology of the network surrounding it, the routes to network destinations, next-hop information, and metrics related to the routes. The network device uses the destination IP address to search the routing table for available routes, and selects the entries in the routing table corresponding to these routes. At least one route is identified.

In Step 408, a determination is made about whether multiple routes for routing the packet to the destination are available. If multiple routes are found to be available, the routes with the lowest cost are chosen for further consideration, whereas all routes with a higher cost are discarded. As described above, the cost of the route may be, for example, measured by the number of "hops" (i.e., network devices) that the packet must travel before reaching its destination. If multiple routes of identical lowest cost exist, the method may proceed to Step 410 in order to perform ECMP routing to choose one route from the multiple routes of lowest cost.

In Step 410, the network device obtains the ECMP hash function, the ECMP seed value, and the ECMP barrel shift value, as determined during the initialization of the network device during the startup of the network device (see e.g., FIG. 3).

In Step 412, the network device generates a hash value. The hash value is generated by applying the ECMP hash function to an input that includes packet header information and the ECMP seed value. In one embodiment of the invention, the packet header information may include the source IP address and/or the destination IP address of the packet.

In Step 414, the network device applies a barrel shift, by ECMP barrel shift value, to the hash value obtained in Step 412. For example, the barrel shift may rotate the hash value by a number of digits ranging from 0 to 15.

In Step 416, the network device selects one route from the multiple ECMP routes identified in Step 408. The route is selected by mapping the barrel-shifted hash value to the one of the multiple routes of identical lowest cost, identified in Step 408. For example, if four ECMP routes of identical lowest cost have been identified in Step 408, "(barrel-shifted hash value) mod 4" may map the barrel-shifted hash value to one of the four ECMP routes.

Returning to Step 408, if a determination is made that only a single route of lowest cost exists, the method may proceed to Step 418.

In Step 418, a determination is made about whether the selected route is associated with LAG. If the selected route is found not to be associated with LAG, the method may proceed to Step 420 in order to transmit the packet on the selected route. Otherwise, the method may proceed to Step 422 to select one link from the links in the link aggregation group (LAG).

In Step 420, the network device transmits the packet to the next hop, as determined by the selected ECMP route.

In Step 422, the network device obtains the LAG hash function, the LAG seed value, and the LAG barrel shift value, as determined during the initialization of the network device during the startup of the network device (see FIG. 3).

In Step 424, the network device generates a hash value. The hash value is generated by applying the LAG hash function to an input that includes packet header information and the LAG seed value. In one embodiment of the invention, the packet header information may include the source IP address and/or the destination IP address of the packet.

In Step 426, the network device applies a barrel shift, by LAG barrel shift value, to the hash value. For example, the barrel shift may rotate the hash value by a number of digits ranging from 0 to 15.

In Step 428, the network device selects one link from the multiple links of the LAG identified in Step 418. The link is selected by mapping the barrel-shifted 16-bit hash value to the multiple links of the LAG using a modulo operation. For example, if the LAG includes seven links, "(barrel-shifted hash value) mod 7" may map the barrel-shifted hash value to one of the seven links.

In Step 430, the network device transmits the packet to the next hop determined by the route obtained either directly from the routing table or from the ECMP routing method, as described above, via the link determined by the LAG selection.

In one or more embodiments of the invention, where the network device includes multiple network chips located on one or more line cards, method described in FIG. 4 is implemented for each network chip.

Embodiments of the invention enable a network device-specific automated selection of routing parameters. Such automated selection of network device-specific routing parameters ensures that multiple interconnected network devices base their routing decisions on non-identical sets of routing parameters without requiring manual configuration of each network device by a network administrator. Interconnected network devices implementing one or more embodiments of the invention limit the likelihood that network polarization occurring in a network (i.e., when network traffic is concentrated on a few routes, instead of being distributed evenly across the available routes).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring network devices, comprising:
   selecting a first hash function to use to process packets using Equal-Cost Multi-Path (ECMP) on a network device, wherein the first hash function is selected from a set of hash functions using a second hash function, a network chip identification number (ID) of the network chip in the network device, a network device media access control (MAC) address, and an ECMP flag;
   selecting a third hash function to use to process packets using a Link Aggregation Group (LAG), wherein the third hash function is selected from the set of hash functions using a fourth hash function, the network chip ID of the network chip in the network device, the network device MAC address, and the LAG flag; and
   processing a packet received by the network device using at least one selected from a group consisting of the first hash function and the third hash function.

2. The method of claim 1, further comprising:
selecting an ECMP seed value using a fifth hash function, the network chip ID, the network device MAC address, and the ECMP flag,
wherein the processing the packet further comprises using the ECMP seed value.

3. The method of claim 1, further comprising:
selecting an ECMP barrel shift value using a fifth hash function, the network chip ID, the network device MAC address, and the ECMP flag,
wherein the processing the packet further comprises using the ECMP barrel shift value.

4. The method of claim 1, further comprising:
selecting a LAG seed value using a fifth hash function, the network chip ID, the network device MAC address, and the LAG flag,
wherein the processing the packet further comprises using the LAG seed value.

5. The method of claim 1, further comprising:
selecting a LAG barrel shift value using a fifth hash function, the network chip ID, the network device MAC address, and the LAG flag,
wherein the processing the packet further comprises using the LAG barrel shift value.

6. The method of claim 1, wherein the first hash function and the third hash function are selected during a boot phase of the network device, after powering up the network device.

7. The method of claim 1, wherein the first hash function and the third hash function are selected from a set of hardware-implemented hash functions.

8. A network device, the network device comprising:
a network chip;
a plurality of ports;
a network device operating system (OS) that:
selects a first hash function to use to process packets using Equal-Cost Multi-Path (ECMP) on a network device, wherein the first hash function is selected from a set of hash functions using a second hash function, a network chip identification number (ID) of the network chip in the network device, a network device media access control (MAC) address, and an ECMP flag;
selects a third hash function to use to process packets using a Link Aggregation Group (LAG), wherein the third hash function is selected from the set of hash functions using a fourth hash function, the network chip ID of the network chip in the network device, the network device MAC address, and the LAG flag; and
processes a packet received by the network device, via one of the plurality of ports, using at least one selected from a group consisting of the first hash function and the third hash function.

9. The network device of claim 8, wherein the network device further:
selects an ECMP seed value using a fifth hash function, the network chip ID, the network device MAC address, and the ECMP flag,
wherein the processing the packet further comprises using the ECMP seed value.

10. The network device of claim 8, wherein the network device further:
selects an ECMP barrel shift value using a fifth hash function, the network chip ID, the network device MAC address, and the ECMP flag,
wherein the processing the packet further comprises using the ECMP barrel shift value.

11. The network device of claim 8, wherein the network device further:
selects a LAG seed value using a fifth hash function, the network chip ID, the network device MAC address, and the LAG flag,
wherein the processing the packet further comprises using the LAG seed value.

12. The network device of claim 8, wherein the network device further:
selects a LAG barrel shift value using a fifth hash function, the network chip ID, the network device MAC address, and the LAG flag,
wherein the processing the packet further comprises using the LAG barrel shift value.

13. The network device of claim 8, further comprising:
a hash function module operatively connected network device OS, wherein the first hash function and the third hash function are selected from a set of hardware-implemented hash functions implemented by the hash function module.

14. The network device of claim 8, wherein the network device is a router.

15. The network device of claim 8, wherein the network device is a multi-layer switch.

16. A non-transitory computer readable medium comprising instructions, that enable a network device to:
select a first hash function to use to process packets using Equal-Cost Multi-Path (ECMP) on the network device, wherein the first hash function is selected from a set of hash functions using a second hash function, a network chip identification number (ID) of the network chip in the network device, a network device media access control (MAC) address, and an ECMP flag;
select a third hash function to use to process packets using a Link Aggregation Group (LAG), wherein the third hash function is selected from the set of hash functions using a fourth hash function, the network chip ID of the network chip in the network device, the network device MAC address, and the LAG flag; and
process a packet received by the network device, via one of a plurality of ports, using at least one selected from a group consisting of the first hash function and the third hash function.

17. The non-transitory computer readable medium of claim 16, further comprising instructions, that enable the network device to:
select an ECMP seed value using a fifth hash function, the network chip ID, the network device MAC address, and the ECMP flag,
wherein the processing the packet further comprises using the ECMP seed value.

18. The non-transitory computer readable medium of claim 16, further comprising instructions, that enable the network device to:
select an ECMP barrel shift value using a fifth hash function, the network chip ID, the network device MAC address, and the ECMP flag,
wherein the processing the packet further comprises using the ECMP barrel shift value.

19. The non-transitory computer readable medium of claim 16, further comprising instructions, that enable the network device to:
select a LAG seed value using a fifth hash function, the network chip ID, the network device MAC address, and the LAG flag,
wherein the processing the packet further comprises using the LAG seed value.

20. The non-transitory computer readable medium of claim 16, further comprising instructions, that enable the network device to:
  select a LAG barrel shift value using a fifth hash function, the network chip ID, the network device MAC address, and the LAG flag,
  wherein the processing the packet further comprises using the LAG barrel shift value.

* * * * *